United States Patent
Okura et al.

(10) Patent No.: US 9,608,526 B2
(45) Date of Patent: Mar. 28, 2017

(54) DC/DC CONVERTER, ON-BOARD UNIT AND CHARGING DEVICE

(75) Inventors: Susumu Okura, Tokyo (JP); Takashi Ohsawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 326 days.

(21) Appl. No.: 14/371,682

(22) PCT Filed: Apr. 27, 2012

(86) PCT No.: PCT/JP2012/002914
§ 371 (c)(1),
(2), (4) Date: Jul. 10, 2014

(87) PCT Pub. No.: WO2013/160960
PCT Pub. Date: Oct. 31, 2013

(65) Prior Publication Data
US 2014/0368167 A1   Dec. 18, 2014

(51) Int. Cl.
*H02M 3/335* (2006.01)
*B60Q 1/30* (2006.01)
*B60L 11/18* (2006.01)
*H02J 5/00* (2016.01)

(52) U.S. Cl.
CPC ..... *H02M 3/33507* (2013.01); *B60L 11/1811* (2013.01); *B60Q 1/30* (2013.01); *H02J 5/005* (2013.01); *H02M 3/33576* (2013.01); *B60L 2210/10* (2013.01)

(58) Field of Classification Search
CPC .................................................. H02M 3/33507
See application file for complete search history.

(56) References Cited

U.S. PATENT DOCUMENTS

| 4,958,268 A | 9/1990 | Nagagata et al. |
| 5,764,495 A * | 6/1998 | Faulk ................ H02M 3/33507 323/303 |
| 6,118,249 A | 9/2000 | Brockmann et al. |
| 6,535,133 B2 * | 3/2003 | Gohara ...................... B60J 5/06 320/108 |

(Continued)

FOREIGN PATENT DOCUMENTS

| CA | 2 639 155 A1 | 3/2009 |
| CN | 1585247 A | 2/2005 |

(Continued)

*Primary Examiner* — Emily P Pham
(74) *Attorney, Agent, or Firm* — Birch, Stewart, Kolasch & Birch, LLP

(57) ABSTRACT

A DC/DC converter 1 is configured to allow separation of a primary side constitution unit 3 and a secondary side constitution unit 4 of a transformer 2. A secondary side switching element FET 2 is provided in the secondary side constitution unit 4, and controls power supply to a load 12 by intermitting an output of a secondary winding L2. The primary side constitution unit 3 detects an electrical behavior of the primary side generated by the intermittent operation of the secondary side, and controls the power supplied from the primary winding L1 to the secondary winding L2 by operating the intermittent operation of the primary side switching element FET 1 such that a cycle or duty of the intermittent operation of the secondary side falls within a predetermined range.

17 Claims, 12 Drawing Sheets

(56) References Cited

U.S. PATENT DOCUMENTS

| | | | |
|---|---|---|---|
| 7,199,569 B1* | 4/2007 | Nakahori | H02M 3/335 323/355 |
| 7,894,214 B1* | 2/2011 | Chen | H02M 3/33592 363/21.05 |
| 8,415,824 B2* | 4/2013 | Chemin | B60L 3/00 307/9.1 |
| 9,240,276 B2* | 1/2016 | Dynes | B60L 11/182 |
| 2005/0041441 A1 | 2/2005 | Nagai et al. | |
| 2006/0209571 A1* | 9/2006 | Aso | H02M 3/33592 363/21.01 |
| 2006/0220591 A1 | 10/2006 | Marchand et al. | |
| 2008/0055944 A1* | 3/2008 | Wang | H02M 3/33592 363/21.06 |
| 2008/0304295 A1 | 12/2008 | Chou | |
| 2010/0110732 A1* | 5/2010 | Moyer | H02M 3/33592 363/19 |
| 2010/0123430 A1 | 5/2010 | Kojima et al. | |
| 2010/0176659 A1 | 7/2010 | Aoyama et al. | |
| 2011/0001355 A1* | 1/2011 | Abadia | H02M 7/003 307/10.1 |
| 2011/0096573 A1* | 4/2011 | Zhu | H02M 3/33523 363/21.17 |
| 2011/0148350 A1* | 6/2011 | Wegener | B60L 11/182 320/108 |
| 2011/0305043 A1* | 12/2011 | Matsumoto | H02M 3/33592 363/21.01 |

FOREIGN PATENT DOCUMENTS

| | | |
|---|---|---|
| DE | 198 37 675 A1 | 2/2000 |
| DE | 10 2007 060 811 A1 | 3/2009 |
| DE | 10 2011 010 049 A1 | 11/2011 |
| EP | 1 432 097 A1 | 6/2004 |
| JP | 2-261053 A | 10/1990 |
| JP | 3-98432 A | 4/1991 |
| JP | 2001-57744 A | 2/2001 |
| JP | 2003-37950 A | 2/2003 |
| JP | 2003-204673 A | 7/2003 |
| JP | 2003-250233 A | 9/2003 |
| JP | 2006-136047 A | 5/2006 |
| JP | 2006-288195 A | 10/2006 |
| JP | 2007-282356 A | 10/2007 |
| JP | 2008-306921 A | 12/2008 |
| JP | 2010-35147 A | 2/2010 |
| JP | 2010-166659 A | 7/2010 |
| JP | 2011-217605 A | 10/2011 |
| WO | WO 2008/094096 A1 | 8/2008 |

* cited by examiner

DC/DC CONVERTER, ON-BOARD UNIT AND CHARGING DEVICE

TECHNICAL FIELD

The present invention relates to a DC/DC converter configured to allow separation of a primary side and a secondary side of a transformer, and relates to an on-board unit and a charging device that use this DC/DC converter.

BACKGROUND ART

A technology related to an LED (light emitting diode) has made rapid progress, and the LED in recent years has reached the emitted light quantity that can secure required brightness with less power; with backed up by a long service life thereof, the LED has become popular as a vehicular light source to be substituted for a conventional bulb with a tungsten filament. Since the LED is compact and lightweight, and can emit light in stable brightness by simple control, a lamp using the LED can be necessarily configured to be compact, thin, and lightweight. Moreover, the LED has high resistance to vibration and shock; thus, in a case where it is used as a light source of a lamp equipped in a vehicle trunk lid, for example, even if a strong shock is applied thereto when the trunk lid is closed, no LED is broken unlike the filament of the conventional bulb. In other words, the LED can be used as the light source of the lamp equipped in a movable part such as the trunk lid without requiring a special shock absorbing member. For this reason, the LED is suitable for a light source of an in-vehicle lamp.

FIG. 17 shows an example of installing a tail lamp 100 finished to be thin using the above LED in a trunk lid 101. Note that FIG. 18 shows in comparison an example in which a tail lamp 102 that uses the conventional bulb is arranged in the vehicle body side.

The use of the LED allows the tail lamp 100 to be thin, which enlarges the capacity of a trunk. In addition, when part of the thinned tail lamp 100 is arranged in the trunk lid 101 side, an opening W of the trunk lid 101 especially at the rear part of the vehicle can be enlarged as compared with the opening w shown in FIG. 18, which is favorable for loading/unloading of large luggage.

At this time, in a case where a wiring supplying power to the LED serving as the light source of the tail lamp 100 is routed with a detour from the vehicle body to the tail lamp 100 on the trunk lid 101 via a hinge part of the trunk lid 101, a member for protecting this wiring becomes necessary from avoiding damage to the wiring and a point of view on design (appearance). Therefore, it is preferable to be fed directly in a non-contact manner from the vehicle body side while eliminating a feeding wiring routed in the trunk lid 101 to the LED of the tail lamp 100.

In order to light this LED, a DC/DC converter to control an applied voltage and a conducting current to a proper value is conveniently used; thus, for this DC/DC converter, when the one configured to allow separation of the primary side and the secondary side of a transformer is used, it is possible to install the primary side in the vehicle body side, and the second side in the trunk lid side, respectively.

FIG. 19 shows an example of a lighting device for lighting the LED serving as the light source of the tail lamp 100 of FIG. 17. A primary side constitution unit 103 of the DC/DC converter used in the lighting device is arranged in the vehicle body side, and a secondary side constitution unit 104 is arranged in the trunk lid 101 side. When the trunk lid 101 is opened, the primary side constitution unit 103 and the secondary side constitution unit 104 are separated from each other. With the use of the lighting device configured to allow separation of the primary side constitution unit 103 and secondary side constitution unit 104, a wiring routed with a detour and a member for protecting this wiring can be reduced. Then, an appearance on design inside the trunk can be preserved.

Note that as a matter of course, even in the DC/DC converter separated in the primary and secondary sides, it is necessary to control an output power thereof appropriately. In a DC/DC converter having a configuration as shown in FIG. 19, a conventional example that performs control of the primary side while a state of supply power to a load connected to the secondary side is transmitted from the secondary side to the first side (fed back) will be described below.

PRIOR ART DOCUMENTS

Patent Documents

Patent Document 1: Japanese Patent Application Laid-open No. H2-261053
Patent Document 2: Japanese Patent Application Laid-open No. 2003-37950
Patent Document 3: Japanese Patent Application Laid-open No. 2003-250233
Patent Document 4: Japanese Patent Application Laid-open No. 2008-306921
Patent Document 5: Japanese Patent Application Laid-open No. 2003-204673
Patent Document 6: Japanese Patent Application Laid-open No. 2010-35147

SUMMARY OF THE INVENTION

Problems to be Solved by the Invention

The above Patent Document 1 has the following configuration: a self-excited (self-commutated) DC/DC converter is used in a switching power supply; both terminals of a secondary (output) side rectifier diode are short-circuited in synchronization with an operation of the DC/DC converter by a control circuit provided in the secondary side to thus change an excitation state of a transformer, and an operation of the primary side is operated to thus perform control of an output voltage thereof. With this configuration, while the transformer is miniaturized, a response of the output voltage is improved, and a circuit configuration thereof is simplified by removing a photo coupler for feedback.

The above Patent Documents 2 and 3 use the following self-excited DC/DC converter: in a non-contact power transmission device having a power supply side (feed side) and a load side (reception side) that are attachable/detachable from each other, when part of a secondary winding wound around a transformer is short-circuited to thus change the excitation state of the transformer, a self-excited oscillation circuit of the primary (power supply) side cannot maintain oscillations to be thus stopped. It is a configuration such that a control circuit of the secondary (load) side controls a transistor for short-circuiting the winding of the secondary side to control a circuit of the primary side.

The above Patent Document 4 has the following configuration: a self-excited DC/DC converter is used in a switching power supply; both terminals of a secondary side rectifier diode are short-circuited, or short-circuited with an interposed resistance to thus change the excitation state of a transformer, and an operation of the primary side is operated to thus perform control of an output voltage thereof. With this configuration, an efficiency during an operation of the switching power supply is improved, and output voltage stability at no load to be assumed as a drawback in a feedback circuit using a photo coupler is improved.

All of the conventional examples of the above Patent Documents 1 to 4 use the self-excited DC/DC converter, and have the configuration in which part of the secondary (load) unit is short-circuited to manipulate the self-excitation operation in the primary side, to thus control an output power thereof. This self-excited DC/DC converter uses a flyback transformer and has the configuration suitable for a relatively small power DC/DC converter; however, there is a problem such that due to a narrow range of the power that can be stably outputted, the configuration is poor in outputting arbitrarily the power over a wide range.

Particularly in a large power DC/DC converter that needs to make a resonance operation of the transformer at a specified frequency, the self-excited DC/DC converter in which the operation frequency is changed depending on the magnitude of the output power is hard to be used, and thus a forward DC/DC converter by a line commutation operation is often used for the large power one.

Note that in the above Patent Documents 1 to 4, part of the output of the transformer is configured to be short-circuited, so that power loss occurs due to the short-circuiting. From this point also, it is unfavorable to use this transformer as the DC/DC converter for large power.

The above Patent Document 5 has the following configuration: in a non-contact power supply device, in order to stop the primary (input) side depending on a state of the secondary (output) side, an auxiliary winding for superimposing a signal to transmit the state of the secondary side is provided to the secondary side core of the transformer, and a reception part that receives the corresponding signal is provided in the first side, and thus the power supplied from the primary side of the transformer is controlled by performing a feedback from the secondary side to the primary side.

The above Patent Document 6 has a configuration in which in a non-contact charger for an electronic device such as a mobile phone, in order to transmit the state of an electronic device mounted on the secondary (output) side to perform feedback control, each of the electronic device and a signal transmission/reception part that transmits the state are provided to perform a feedback.

In the above Patent Documents 5 and 6, it is configured by adding to an original configuration of a transformer that transmits power a function of superimposing to the corresponding transformer a signal, which is different from the power supply, to transmit the state of the secondary side to the primary side. In the corresponding configuration, in order to perform the feedback, some dedicated members are used, and thus the transformer and peripheral components become inevitably complicated; thus, there is a problem such that the configuration is not suitable for a DC/DC converter with a simple configuration.

As described above, in the DC/DC converter that uses the transformer in which the primary winding and secondary winding can be separated in the conventional method, and forms the primary side constitution part and the secondary side constitution part independently, in order to output a desired power or desired voltage and current to the secondary side, there are the following examples:

an example using a self-excited DC/DC converter to operate the circuit in the primary side from the secondary side as shown in Patent Documents 1 to 4; and an example controlling the power to be supplied from the primary side to the secondary side of the transformer on the basis of the feedback of the output state with the use of a magnetic pulse transformer, an optical photo-coupler or the like as shown in Patent Documents 5 and 6. However, there are the foregoing problems in any method of the above.

The present invention is made to solve the foregoing problems, and an object of the invention is to provide a DC/DC converter that is capable of outputting large power using a separately excited (line commutated) DC/DC converter, and that allows separation of the primary side and the secondary side with a simply configuration without using a special interface for performing a feedback from the secondary side to the primary side, and provide an on-board unit and a charging device each using this DC/DC converter.

Means for Solving the Problem

A DC/DC converter according to the present invention is a DC/DC converter configured to allow separation of a primary side constitution unit and a secondary side constitution unit of a transformer, the primary side constitution unit including: a primary winding of the transformer; a primary side switching element that intermits a current flowing from an external power source to the primary winding; and a primary side control unit that controls power supplied to the primary winding to an arbitrary value by operating the intermittent operation of the primary side switching element, and the secondary side constitution unit including: a secondary winding of the transformer; a secondary side switching element that intermits a current flowing from the secondary winding to a load connected to the secondary side constitution unit; and a secondary side control unit that controls power supplied to the load to an arbitrary value by operating the intermittent operation of the secondary side switching element, wherein the primary side control unit detects an electrical behavior inside the primary side constitution unit generated by the intermittent operation of the secondary side switching element, and controls power supplied from the primary winding to the secondary winding by operating the primary side switching element on the basis of the electrical behavior.

An on-board unit according to the invention includes: a load unit mounted on a vehicle; the aforementioned DC/DC converter that supplies power to the load unit; and a movable part that is movable against the vehicle, and the primary side constitution unit of the DC/DC converter is installed in the vehicle, and the secondary side constitution unit and the load unit are installed in the movable part.

A charging device according to the invention includes: the aforementioned DC/DC converter that supplies charging power to a battery mounted on the vehicle, and the primary side constitution unit of the DC/DC converter is installed outside the vehicle, and the secondary side constitution unit is installed in the vehicle.

Effect of the Invention

According to the invention, the primary side control unit detects the electrical behavior inside the primary side constitution unit generated by the intermittent operation of the secondary side switching element, and controls power supplied to the secondary side constitution unit by controlling the intermittent operation of the primary side switching element on the basis of this electrical behavior; thus, it is adapted to be capable of outputting large power using a line commutated DC/DC converter.

In addition, without using a special interface for performing a feedback from the secondary side to the primary side, a DC/DC converter having the primary side constitution unit and the secondary side constitution unit separable from each other can be provided with a simple structure, and also an on-board unit and a charging device each using this DC/DC converter can be provided.

BEST MODE FOR CARRYING OUT THE INVENTION

In the following, in order to explain the present invention in more detail, embodiments for carrying out the invention will be described with reference to the accompanying drawings.

Embodiment 1

Figure 1:
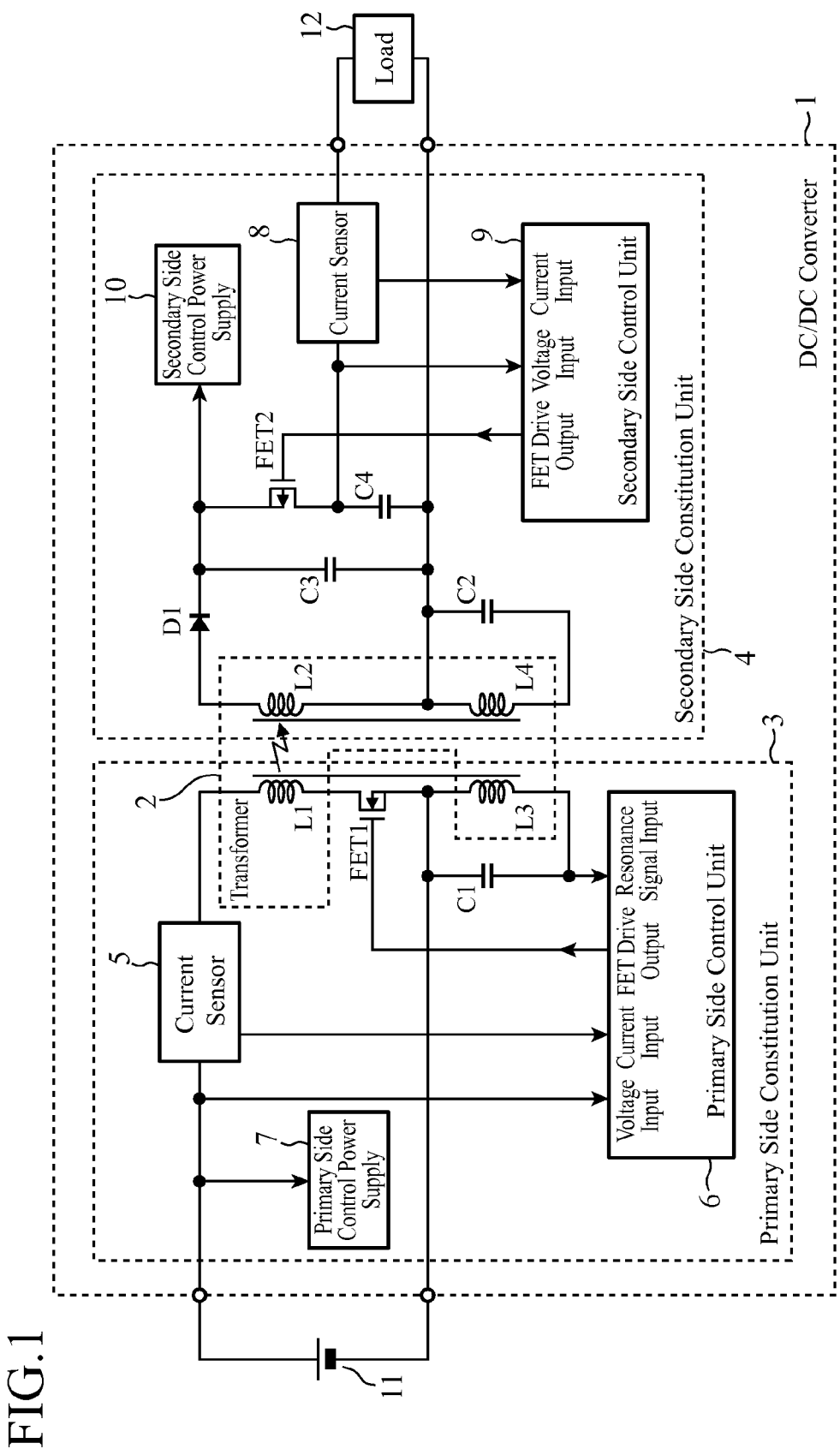
FIG. 1 is a circuit diagram illustrating a configuration of a DC/DC converter according to Embodiment 1 of the present invention.

A DC/DC converter 1 shown in FIG. 1 includes a primary side constitution unit 3 incorporating a primary side winding L1 of a transformer 2 and an auxiliary winding L3 for resonance (primary side auxiliary winding), and a secondary side constitution unit 4 incorporating therein a secondary winding L2 of the transformer 2 and an auxiliary winding L4 for resonance (secondary side auxiliary winding), which are individually formed to be thus separable from each other. The DC/DC converter 1 is connected to an external DC power source 11 and a load 12 to thus supply power from the DC power source 11 to the load 12.

The primary side constitution unit 3 includes the primary winding L1 of the transformer 2, a resonance circuit having the auxiliary winding L3 and a resonance capacitor C1 connected in parallel, a primary side switching element FET (field-effect transistor) 1 that supplies intermittently an input from the DC power source 11 to the primary winding L1, a primary side current sensor 5 that detects a current flowing in the primary winding L1, a primary side control unit 6 that controls the intermittent operation of the primary side switching element FET 1, and a primary side control power supply 7 that generates control power for the primary side control unit 6.

The other secondary side constitution unit 4 includes the secondary winding L2 of the transformer 2, a resonance circuit having the auxiliary winding L4 and a resonance capacitor C2 connected in parallel, a rectifier diode D1 that rectifies the output of the secondary winding L2, a smoothing capacitor C3 that smoothes the output of the secondary winding L2, a secondary side switching element FET 2 that supplies intermittently the output of the secondary winding L2 to the load 12, a smoothing capacitor C4 that smoothes the output intermitted by the secondary side switching element FET 2, a secondary side current sensor 8 that detects the output current flowing in the load 12, a secondary side control unit 9 that controls the intermittent operation of the secondary side switching element FET 2, and a secondary side control power supply 10 that generates control power for the secondary side control unit 9.

The primary side control unit 6 is configured by, for example, a digital control using a microcomputer having a high-speed operation function, an analog control using an error amplifier circuit constructed by an operational amplifier and so on, or a digital-analog control combining a general purpose microcomputer with the error amplifier circuit. Similarly to the primary side control unit 6, the secondary side control unit 9 is also configured by, for example, the digital control, analog control, or digital-analog control.

When the primary side constitution unit 3 and secondary side constitution unit 4 are arranged in proximity at a predetermined position, the primary winding L1 and secondary winding L2 face each other as shown in FIG. 1 to be magnetically coupled. When a current flows through the primary winding L1, a voltage is induced in the secondary winding L2 because of the magnetic coupling with the primary winding L1. Since the secondary winding L2 is magnetically coupled to the secondary auxiliary winding L4, a voltage is also generated in the auxiliary winding L4 at this time. In addition, a voltage is also induced in the primary side auxiliary winding L3 that is magnetically coupled to the primary winding L1.

Next, an operation of the DC/DC converter 1 will be explained.

In the secondary side constitution unit 4, the secondary side switching element FET 2 that intermits the output current is provided downstream of the rectifier circuit constituted by the rectifier diode D1 and the smoothing capacitor C3. The secondary side control unit 9 operates the secondary side switching element FET 2 on the basis of the output voltage applied to the load 12 and the output current detected by the secondary side current sensor 3 to control the power, or the current and voltage to be supplied to the load 12 to a suitable value.

The secondary side control unit 9 performs PFM (Pulse Frequency Modulation) control such that the OFF (non-conducting) time of the secondary side switching element FET 2 is made constant, while the ON (conducting) time is made variable to thereby change a repetition cycle consisting of the ON time and OFF time, or operates intermittently the secondary side switching element FET 2 to perform PWM (Pulse Width Modulation) control such that a ratio of the ON time and OFF time is changed while the repetition cycle of the ON and OFF times is made constant.

Note that in the PFM control, the ON time may be made constant. Additionally, in the PWM control, the ratio of the OFF time with respect to the cycle may be made variable to change a duty ratio, or the ratio of the ON time may be made variable to change the duty ratio.

In this operation, when the secondary side switching element FET 2 is turned OFF, which corresponds to an opened state of the output, that is, a state of no load, so that the current outputted by the secondary winding L2 is decreased, and the voltage generated in the secondary winding L2 is increased.

In addition, at the time of the OFF time of the secondary side switching element FET 2, an emission destination of the current flown from the DC power source 11 into the primary winding L1 is interrupted, and thus the voltage generated in the primary winding L1 is also increased. Further, in the configuration including the auxiliary winding L3 for resonance and the resonance capacitor C1 as shown in FIG. 1, the terminal voltage of the resonance capacitor C1 is also increased.

Figure 2:
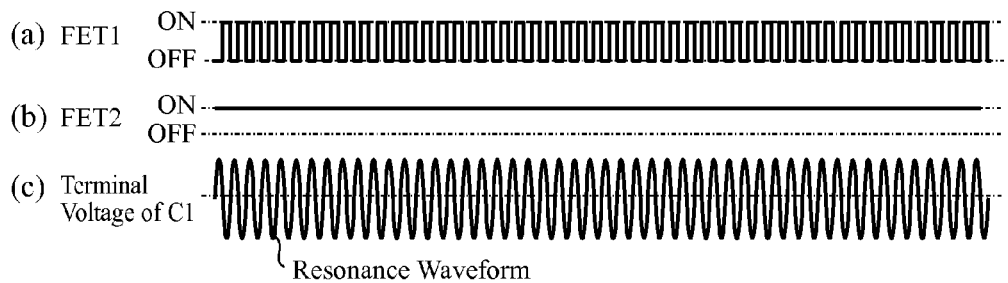
FIG. 2 is an operation waveform chart of the DC/DC converter according to Embodiment 1, and shows a case where a secondary side switching element FET 2 is in an ON state.
Figure 3:
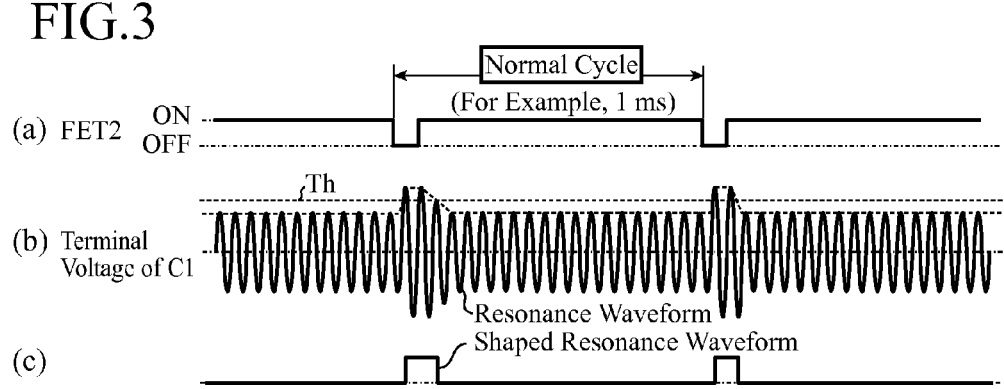
FIG. 3 is an operation waveform chart of the DC/DC converter according to Embodiment 1, and shows a case where an ON/OFF cycle of the secondary side switching element FET 2 is a normal cycle.

Here, FIG. 2 and FIG. 3 show operation waveforms of the DC/DC converter 1. FIG. 2(a) shows a waveform of an ON/OFF operation of the primary side switching element FET 1, FIG. 2(b) and FIG. 3(a) show waveforms of ON/OFF operations of the secondary side switching element FET 2, and FIG. 2(c) and FIG. 3(b) show resonance waveforms of the terminal voltage of the resonance capacitor C1.

The waveform of the terminal voltage of the resonance capacitor C1 is substantially sinusoidal as shown in FIG. 2(c) by the resonance effect of the auxiliary winding L3 for resonance and the resonance capacitor C1. The waveform of current flowing through the auxiliary winding L3 is also substantially sinusoidal. As shown in FIG. 3(b), the terminal voltage of the resonance capacitor C1 is increased with a voltage increase in the primary winding L1 when the secondary side switching element FET 2 is turned OFF as compared to the ON time of the secondary side switching element FET 2.

The primary side control unit 6 includes a rectifier-comparison circuit (not shown) constituted by a diode, comparator, and the like. In the rectifier-comparison circuit, as shown in FIG. 3(c), the terminal voltage (resonance signal) of the resonance capacitor C1 is shaped, a shaped resonance waveform is generated through, for example, a comparison with the comparator of a threshold Th, and then it is determined whether a voltage increasing cycle (that is, corresponding to the ON/OFF cycle of the secondary side switching element FET 2) is proper or not.

Figure 4:
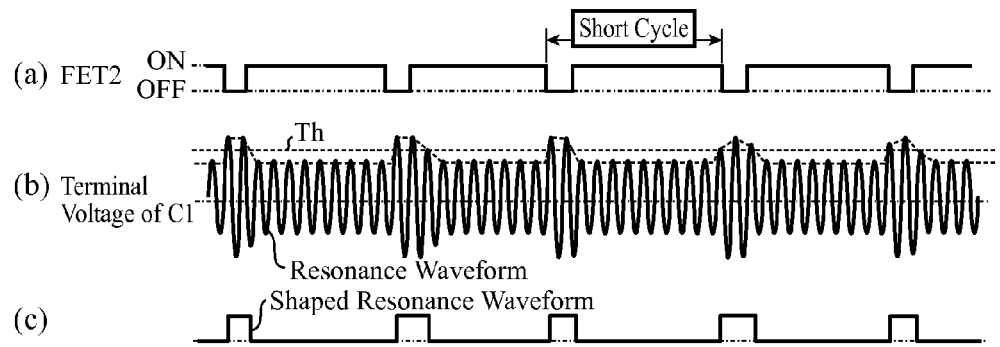
FIG. 4 is an operation waveform chart of the DC/DC converter according to Embodiment 1, and shows a case where the ON/OFF cycle of the secondary side switching element FET 2 is a short cycle.
Figure 5:
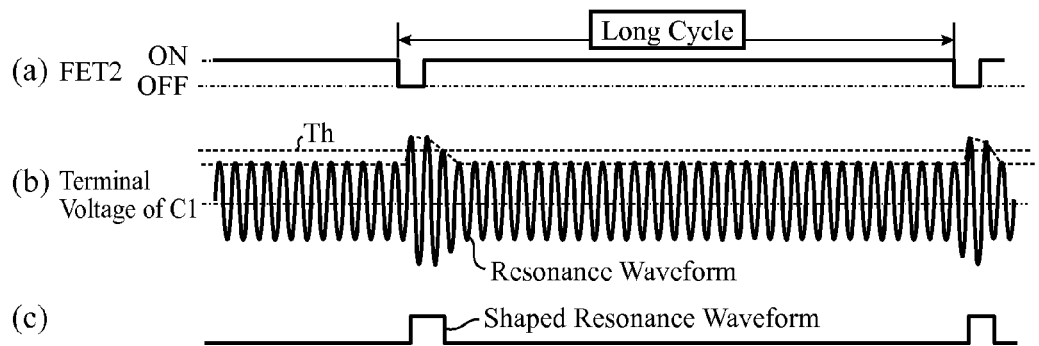
FIG. 5 is an operation waveform chart of the DC/DC converter according to Embodiment 1, and shows a case where the ON/OFF cycle of the secondary side switching element FET 2 is a long cycle.

When the cycle is short as shown in FIG. 4, the primary side control unit 6 narrows an operation duty of the primary side switching element FET 1 to thereby reduce the power input to the primary side, and control is performed to achieve a proper cycle (for example, 1 ms) as shown in FIG. 3. Contrarily, when the cycle is long as shown in FIG. 5, it broadens the operation duty of the primary side switching element FET 1 to thereby increase the power input to the primary side, and control is performed to achieve a proper cycle as shown in FIG. 3. In such a way, the primary side control unit 6 controls the operation duty of the primary side switching element FET 1 on the basis of the terminal voltage of the resonance capacitor C1 to always keep the operation state in FIG. 3.

Note that the waveforms in FIG. 3 to FIG. 5 show a case where the secondary side control unit 9 performs a PFM control such that when the OFF time is made constant (for example, 10 µs) with respect to the secondary side switching element FET 2, a cycle thereof is made variable; however, a PWM control may be performed, and in this case, as omitted in the figure, the cycle of the intermittent operation of the secondary side switching element FET 2 is made constant (for example, 10 µs), while the ratio of the ON time and OFF time is made variable.

When the secondary side control unit 9 performs the PWM control, the other primary side control unit 6 detects a width of a section where the terminal voltage is raised of the resonance capacitor C1 (that is, corresponding to the OFF time of the secondary side switching element FET 2), and determines whether or not this width is appropriate. Then, the following control is performed: when the width is long, the power input to the primary side is reduced by narrowing the operation duty of the primary side switching element FET 1, whereas when the width is short, the power input to the primary side is increased by broadening the operation duty of the primary side switching element FET 1.

Note that in the above, the control operation of the primary side by the PWM control is described; however, this control may be performed by the PFM control.

In such a way, even though the secondary side control unit 9 performs any one of the PFM and PWM controls, the other primary side control unit 6 detects the ON/OFF operation of the secondary side switching element FET 2, and when the ratio occupied by the OFF time is high, in other words, when the power to the load 12 is reduced, the power input to the primary winding L1 is reduced by the PFM control or PWM control.

Contrarily, when the ratio occupied by the OFF time of the secondary side switching element FET 2 is low, in other words, when the power to the load 12 is increased, the power input to the primary winding L1 by the PFM control or PWM control is increased.

With the primary side control unit 6 performing the above operation, in a case where the secondary side control unit 9 performs the PFM control, the ON/OFF operation of the secondary side switching element FET 2 can be kept at a predetermined cycle (for example, 1 ms), while in a case where the secondary side control unit 9 performs the PWM control, the ON/OFF operation of the secondary side switching element FET 2 can be kept at a predetermined ratio (for example, 990 µs/10 µs).

As described above, with the primary side control unit 6 and secondary side control unit 9 performing the respective controls, the DC/DC converter 1 can control the operation of the primary side without providing a special feedback circuit from the secondary side to the primary side. Then, a desired power, or desired voltage and current can be outputted from the secondary side.

Next, an operation where the primary side constitution unit 3 and secondary side constitution unit 4 are separated from each other will be described.

When the secondary side constitution unit 4 is not placed at a normal position with respect to the primary side constitution unit 3 (when they are separated from each other), an abnormal behavior is exhibited to be equal to a state that the secondary side switching element FET 2 is turned OFF for a long time and continuously. Additionally, the abnormal behavior is also exhibited, when no load 12 is connected to an output terminal in the event that the output terminals are short-circuited, or the equivalent.

When the OFF state of the secondary side switching element FET 2 is continued for a predetermined period t1 (for example, 10 ms), the primary side control unit 6 determines this operation as the abnormal behavior, and stops the operation of the primary side switching element FET 1 to stop the power supply from the primary side. Alternatively, when the abnormal behavior is determined, the power supplied from the primary side may be first reduced to a minimum level, and thereafter the power supply may be stopped.

Further, when the primary side constitution unit 3 and secondary side constitution unit 4 are separated from each other, and also when a foreign object such as a metal plate approaches the primary winding L1, the abnormal behavior is exhibited to be equal to a state that the secondary side switching element FET 2 is turned ON for a long time and continuously.

When the ON state of the secondary side switching element FET 2 is continued for the predetermined period t1, the primary side control unit 6 determines this operation as the abnormal behavior, and stops the power supply from the primary side.

As descried above, without adding a special control circuit thereto, the DC/DC converter 1 can achieve a failsafe function to stop the power supply to the secondary side, for example, when the primary side constitution unit 3 and secondary side constitution unit 4 are separated from each other.

Note that the primary side control unit 6 includes a timer circuit (not shown) for clocking the predetermined time period t1 and a waiting period t2 described later.

Further, the DC/DC converter 1 may be provided with a waiting function.

When the intermittent operation of the secondary side switching element FET 2 cannot be detected for the predetermined period t1, in other words, when the secondary side constitution unit 4 is not placed at the normal position with respect to the primary side constitution unit 3; when no load 12 is connected to the output terminal; or when the operation is detected to be equal to the long-time and continuous OFF or ON state of the secondary side switching element FET 2 to be generated, for example, when the output terminals are short-circuited, the primary side control unit 6 stops the operation of the primary side switching element FET 1 for the predetermined waiting period t2 (for example, 10 seconds) to stop the power supply from the primary side (start of a waiting state).

After the predetermined waiting period t2 has passed, the primary side control unit 6 operates the primary side switching element FET 1 for a short time (for example, 10 ms equal to the predetermined period t1) to check the behavior of the primary side in accordance with the operation of the secondary side. At this time, when the behavior of the primary side corresponding to the intermittent operation of the secondary side switching element FET 2 is detected, the primary side control unit 6 determines that the secondary side constitution unit 4 is placed at the normal position, and continues the operation of the primary side switching element FET 1 to carry out a normal power supply operation (return from the waiting state).

On the other hand, when the behavior of the primary side corresponding to the intermittent operation of the secondary side switching element FET 2 cannot be detected, the primary side control unit 6 stops the power supply operation from the primary side again for the predetermined waiting period t2 (maintenance of the waiting state).

Since the above checking operation is repeated regularly (in the above example, at about 10-second intervals), it can be automatically switched to the waiting state, for example, when the primary side constitution unit 3 and the secondary side constitution unit 4 are separated from each other, and it can also be automatically returned from the waiting state when the primary side constitution unit 3 and the secondary side constitution unit 4 are placed at the normal positions. In addition, it can be automatically switched to the waiting state automatically also at the abnormal condition such as short-circuiting to thus stop the power supply.

Note that in the DC/DC converter 1 shown in FIG. 1, the operation as the DC/DC converter may be either of a flyback operation and a forward operation.

Incidentally, in the above description, it is configured to observe the fluctuation of the voltage generated in the auxiliary winding L3 such that the primary side control unit 6 detects the terminal voltage of the resonance capacitor C1; however, it is not limited to this, but the fluctuation of the current flowing through the primary winding L1 (namely the current flowing into the primary side) may be observed to thus determine the intermittent operation of the secondary side switching element FET 2.

Further, it is also possible to determine the intermittent operation of the secondary side switching element FET 2 on the basis of observation of the fluctuation of the voltage or current generated in the primary winding L1 instead of the fluctuation of the voltage or current generated in the auxiliary winding L3; hereinafter, configuration examples of observing the fluctuation of the voltage generated in the primary winding L1 will be presented below with reference to FIG. 6 to FIG. 8. It is noted that in FIG. 6 to FIG. 9 parts that are the same as or equivalent to those of FIG. 1 are given by the same reference numerals, and descriptions thereof will be omitted.

Figure 6:
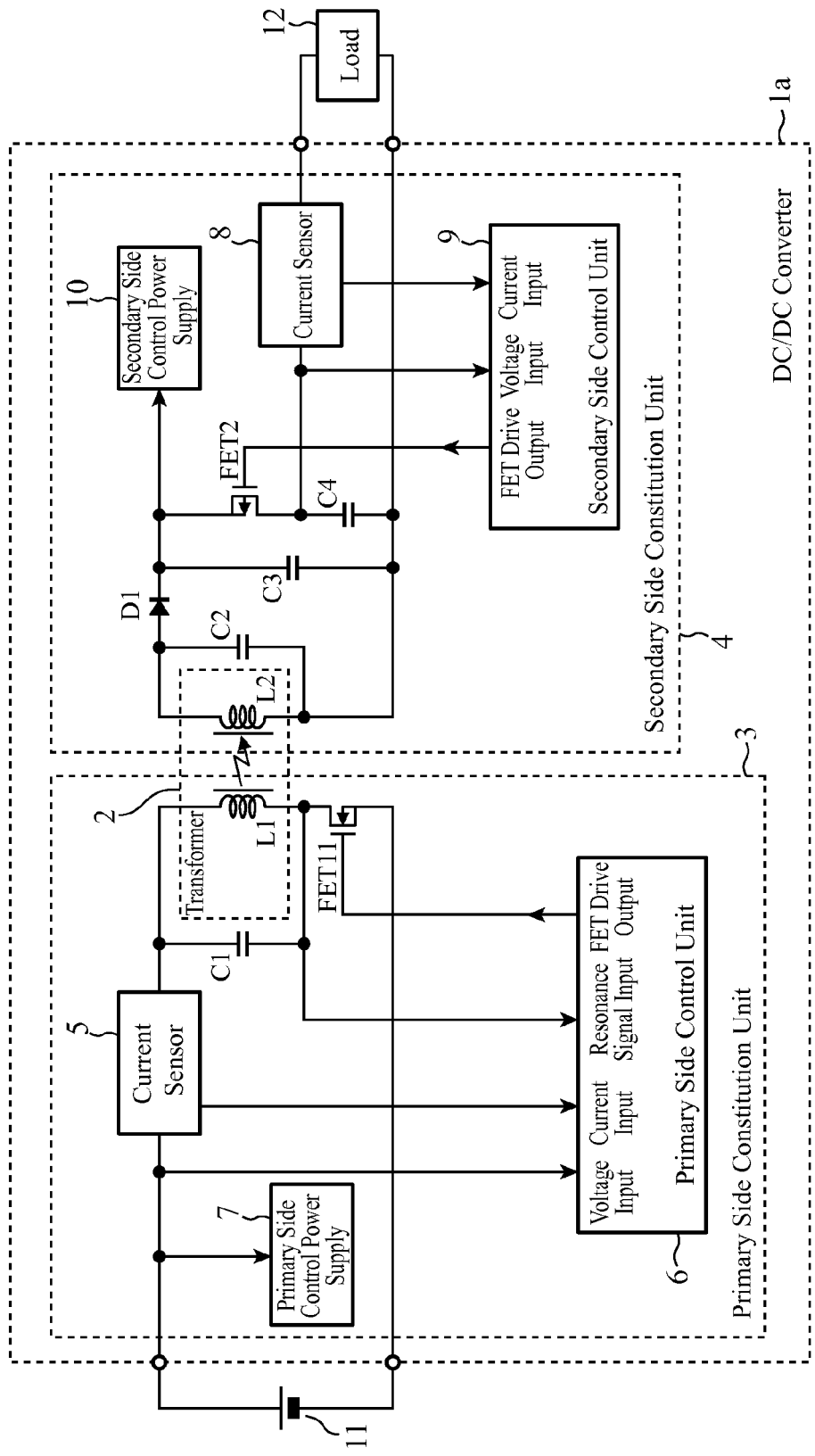
FIG. 6 is a circuit diagram illustrating a variation of the DC/DC converter according to Embodiment 1.

A DC/DC converter 1a shown in FIG. 6 is configured without the auxiliary windings (L3, L4) for resonance at the primary side and secondary side of the transformer 2. Instead, the resonance capacitor C1 is connected in parallel to the primary winding L1 to form a resonance circuit. The resonance capacitor C2 is also connected in parallel to the other second winding L2 to form a resonance circuit. In the DC/DC converter 1a, the operation as the DC/DC converter may be either of the fly back operation and forward operation.

Figure 7:
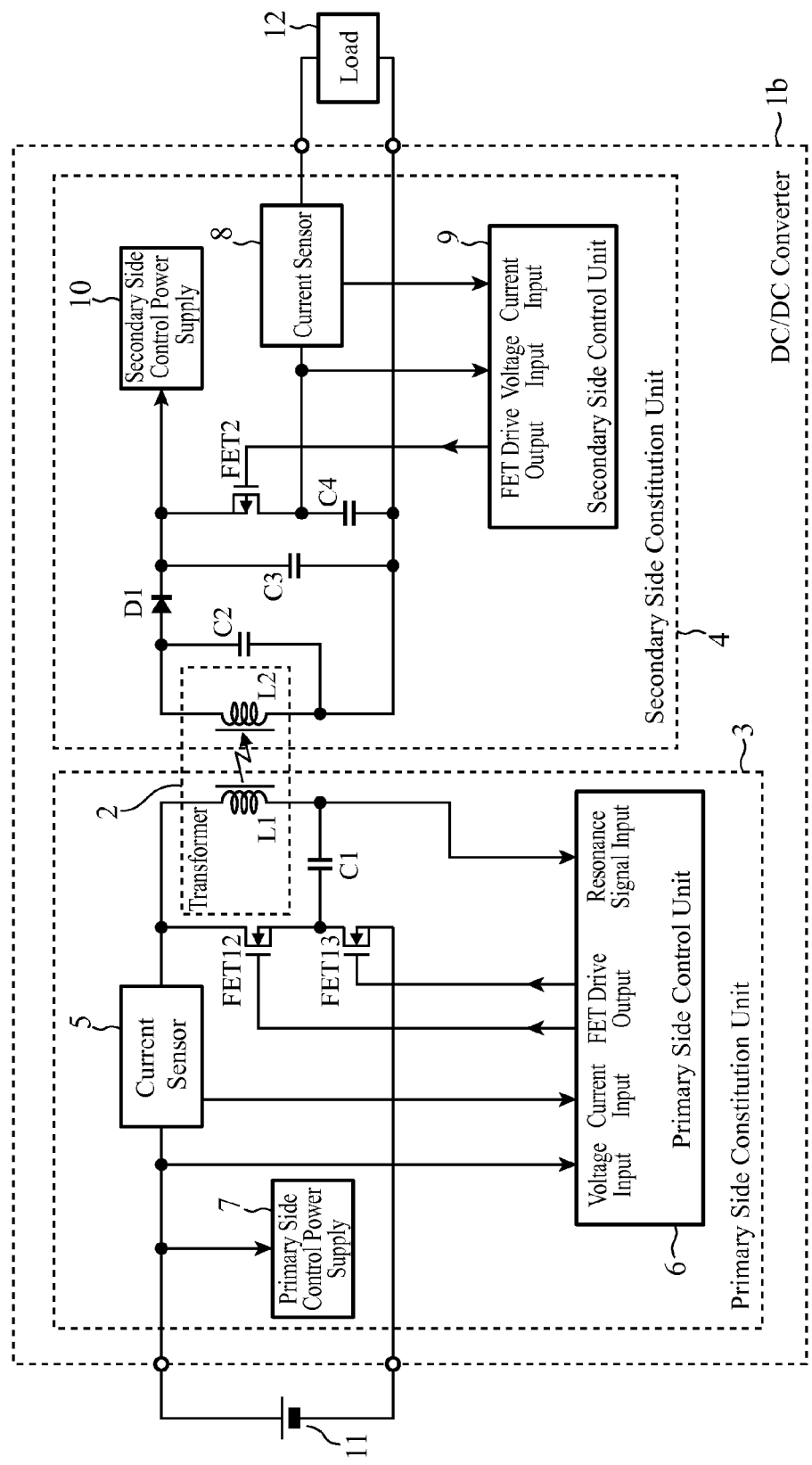
FIG. 7 is a circuit diagram illustrating a variation of the DC/DC converter (half bridge type) according to Embodiment 1.

A DC/DC converter 1b shown in FIG. 7 is a half bridge type one, and two primary side switching elements FET 12 and FET 13 are provided at the primary side to perform ON/OFF operations alternately, which renders a forward operation of the DC/DC converter 1b. Similarly to FIG. 6, the auxiliary windings (L3, L4) for resonance are not provided at the primary side and secondary side of the transformer 2, and the resonance capacitor C1 is connected in series to the primary winding L1 to form a resonance circuit.

Figure 8:
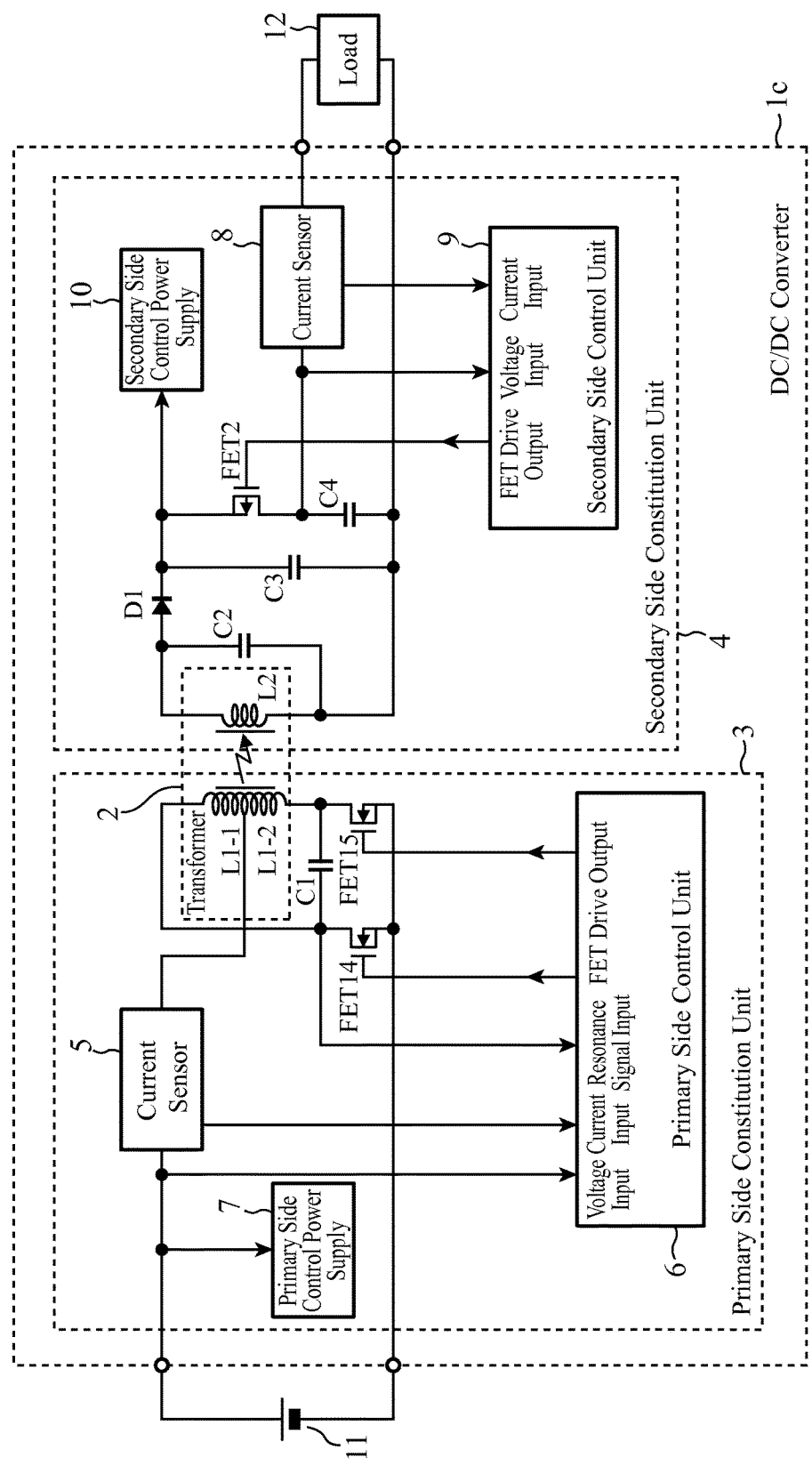
FIG. 8 is a circuit diagram illustrating a variation of the DC/DC converter (push-pull type) according to Embodiment 1.

A DC/DC converter 1c shown in FIG. 8 is a push-pull type one, and a middle tap is provided between primary windings L1-1 and L1-2 of the transformer 2 to perform alternate ON/OFF operations of two switching elements FET 14 and FET 15 provided at the primary side to power the primary windings L1-1 and L1-2 alternately, which renders a forward operation of the DC/DC converter 1c. Similarly to FIG. 6, the auxiliary windings (L3, L4) for resonance are not provided at the primary side and secondary side of the transformer 2, and the resonance capacitor C1 is connected in parallel to the primary windings L1-1 and L1-2 to form a resonance circuit.

In the above, in the DC/DC converters 1a to 1c shown in FIG. 6 to FIG. 8, the drain voltage of the primary side switching element FET 1 is superimposed on the terminal voltage of the resonance capacitor C1, so that waveforms at the times when the secondary side switching element FET 2 is turned ON and when turned OFF are more complex than the one shown in FIG. 3(*b*). Therefore, the constitution of the rectifier-comparison circuit of the primary side control unit 6 for detecting the behavior of the primary side in accordance with the intermittent operation of the secondary side becomes complicated, but the primary side control unit 6 can still determine the intermittent operation of the secondary side switching element FET 2 by observing the drain voltage of the primary side switching element FET 1.

Figure 9:
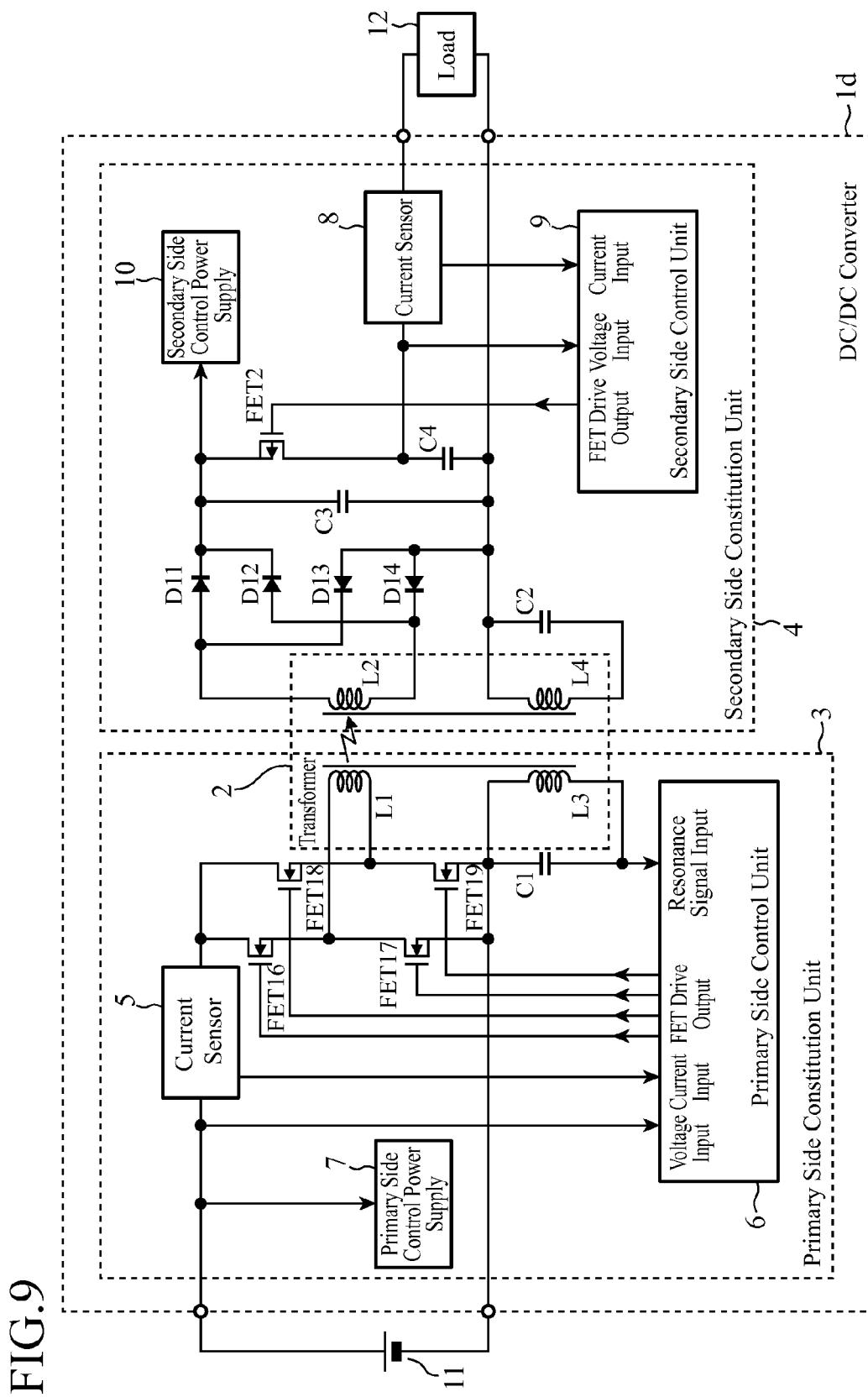
FIG. 9 is a circuit diagram illustrating a variation of the DC/DC converter (full bridge) according to Embodiment 1.

Furthermore, the DC/DC converter 1 can also be modified into a full bridge type one. The DC/DC converter 1d shown in FIG. 9 is a full bridge type converter, and four switching elements FET 16 to FET 19 are provided in the primary side to perform alternate ON/OFF operations of the switching elements FET 16 and FET 19, and the switching elements FET 17 and FET 18, which renders a forward operation of the DC/DC converter 1d. Additionally, a rectifier circuit constituted by rectifier diodes D11 to D14 is provided in the secondary side of the transformer 2.

As described above, various types of DC/DC converters 1a to 1d shown in FIG. 6 to FIG. 9 can be configured to have the primary side constitution unit 3 and secondary side constitution unit 4 separable from each other.

It is noted that in the above configuration, the DC/DC converters that allow easy observation of the fluctuation of the secondary side, and perform the resonance operation with high efficiency are described by way of example; however, by a configuration capable of observing the behavior of the primary side in accordance with the intermittent operation of the secondary side, the primary side constitution unit 3 and secondary side constitution unit 4 of a DC/DC converter having a general constitution without the resonance operation notwithstanding somewhat lower efficiency can also be configured to be separable from each other.

As described above, according to Embodiment 1, the DC/DC converter 1 is configured to allow separation of the primary side constitution unit 3 and the secondary side constitution unit 4 of the transformer 2; the primary side constitution unit 3 includes the primary winding L1 of the transformer 2, the primary side switching element FET 1 that intermits the current flowing from the DC power source 11 to the primary winding L1, and the primary side control unit 6 that controls the power supplied to the primary winding L1 to an arbitrary value by operating the intermittent operation of the primary side switching element FET 1; the secondary side constitution unit 4 includes the secondary winding L2 of the transformer 2, the secondary side switching element FET 2 that intermits the current flowing from the secondary winding L2 to the load 12 connected to the secondary side constitution unit 4, and the secondary side control unit 9 that controls the power (voltage and current) supplied to the load 12 to an arbitrary value by operating the intermittent operation of the secondary side switching element FET 2; the primary side control unit 6 is configured to detect the electrical behavior inside the primary side constitution unit 3 generated by the intermittent operation of the secondary side switching element FET 2, and control the power supplied from the primary winding L1 to the secondary winding L2 by operating the primary side switching element FET 1 on the basis of this electrical behavior. For this reason, without using a special interface for performing a feedback from the secondary (output) side to the primary (input) side, the DC/DC converter having the primary side constitution unit and the secondary side constitution unit separable from each other can be configured with a simple structure.

Moreover, unlike those of Patent Documents 1 to 4 described in the foregoing, the DC/DC converter 1 of Embodiment 1 is a line-commutated one, and it can be thus configured by any one of flyback type and forward type ones, and can also be configured by a large power DC/DC converter. Moreover, since there is no need to short-circuit part of the output of the transformer unlike those of Patent Documents 1 to 4, an operation thereof with high efficiency can be maintained without losing part of the power due to a short-circuiting operation.

Moreover, according to Embodiment 1, it is configured that the secondary side constitution unit 4 has the secondary side auxiliary winding L4 magnetically coupled to the secondary winding L2, and that the primary side constitution unit 3 has the primary side auxiliary winding L3 magnetically coupled to the primary winding L1 and induced by a voltage, and the primary side control unit 6 is adapted to detect the fluctuation of the voltage generated in the auxiliary winding L3, or the fluctuation of the current flowing through the primary winding L1 as the electrical behavior inside the primary side constitution unit 3. For this reason, the state of the secondary side can be fed back to the primary side with a simple configuration, and the primary and secondary side constitution units are separable from each other, so that a preferable DC/DC converter can be configured.

Alternatively, as mentioned above, the primary side control unit 6 may be configured to detect the fluctuation of the voltage generated in the primary winding L1, or the fluctuation of the current flowing through the primary winding L1 as the electrical behavior inside the primary side constitution unit 3. In this configuration also, the state of the secondary side can be fed back to the primary side with a simple configuration, and the primary and secondary side constitution units are separable from each other, so that a preferable DC/DC converter can be configured.

Moreover, according to Embodiment 1, as the intermittent operation of the secondary side switching element FET 2, the secondary side control unit 9 is configured to perform the PFM control that changes the repetition cycle of the conduction and non-conduction by making constant one of the conducting time and non-conducting time of the secondary side switching element FET 2, and making variable the other, or perform the PWM control that changes the ratio of the conducting and non-conducting time by making constant the repetition cycle of the conduction and non-conduction. For this reason, the power output from the secondary side to the load can be controlled to a proper value with a simple structure, and the primary and secondary side constitution units are separable from each other, so that a preferable DC/DC converter can be configured.

Moreover, according to Embodiment 1, the primary side control unit 6 is configured to control the power supplied to the secondary side constitution unit 4, such that the intermittent operation of the secondary side switching element FET 2 has a predetermined cycle when the secondary side control unit 9 is performing the PFM control, or such that the conducting time and non-conducting time of the secondary side switching element FET 2 has a predetermined ratio (duty ratio) when the secondary side control unit 9 is performing the PWM control. For this reason, the power output from the primary side to the secondary side can be controlled to a proper value with a simple configuration, and the primary and secondary side constitution units are separable from each other, so that a preferable DC/DC converter can be configured.

Moreover, according to Embodiment 1, the secondary side control unit 9 is configured to include the smoothing capacitor C4 that smoothes the output of the secondary side switching element FET 2. For this reason, since the voltage output from the secondary side is smoothed, a ripple thereof are suppressed, which improves the performance of the DC/DC converter.

Moreover, according to Embodiment 1, the primary side control unit 6 is configured to stop the operation of the primary side switching element FET 1 when the electrical behavior generated by the intermittent operation of the secondary side cannot be detected for the predetermined period t1 during the intermittent operation of the primary side switching element FET 1. For this reason, a DC/DC converter having the primary side constitution unit and secondary side constitution unit separable from each other and having the failsafe function can be achieved.

Moreover, according to Embodiment 1, when the electrical behavior generated by the intermittent operation of the secondary side cannot be detected for the predetermined period t1 during the intermittent operation of the primary side switching element FET 1, the primary side control unit 6 is configured to stop the operation of the primary side switching element FET 1 for the predetermined waiting time t2, and then resume the intermittent operation, and continue this intermittent operation when the electrical behavior can be detected at the time of this resumption, and stop the operation of the primary side switching element FET 1 again for the predetermined waiting time t2 when the electrical behavior cannot be detected. For this reason, a DC/DC converter having the primary side constitution unit and secondary side constitution unit separable from each other and having the failsafe function can be achieved.

Moreover, according to Embodiment 1, a resonance type DC/DC converter 1 is configured such that the primary side constitution unit 3 includes the auxiliary winding L3 (or the primary winding L1) for resonance and the resonance capacitor C1, and that the secondary side constitution unit 4 includes the auxiliary winding L4 (or the secondary winding L2) for resonance and the resonance capacitor C2. For this reason, the intermittent operation of the secondary side can be easily detected by carrying out the resonance operation (that is, the rectifier-comparison circuit can be made simpler), so that a simple DC/DC converter can be configured. Also, because the voltage applied to the primary side switching element FET 1 and secondary side switching element FET 2 is substantially sinusoidal due to the resonance action, a switching loss thereof can be reduced to improve power efficiency thereof.

Note that for the above auxiliary winding for resonance, the one wound coaxially with the primary winding or secondary winding should be used.

Embodiment 2

Figure 10:
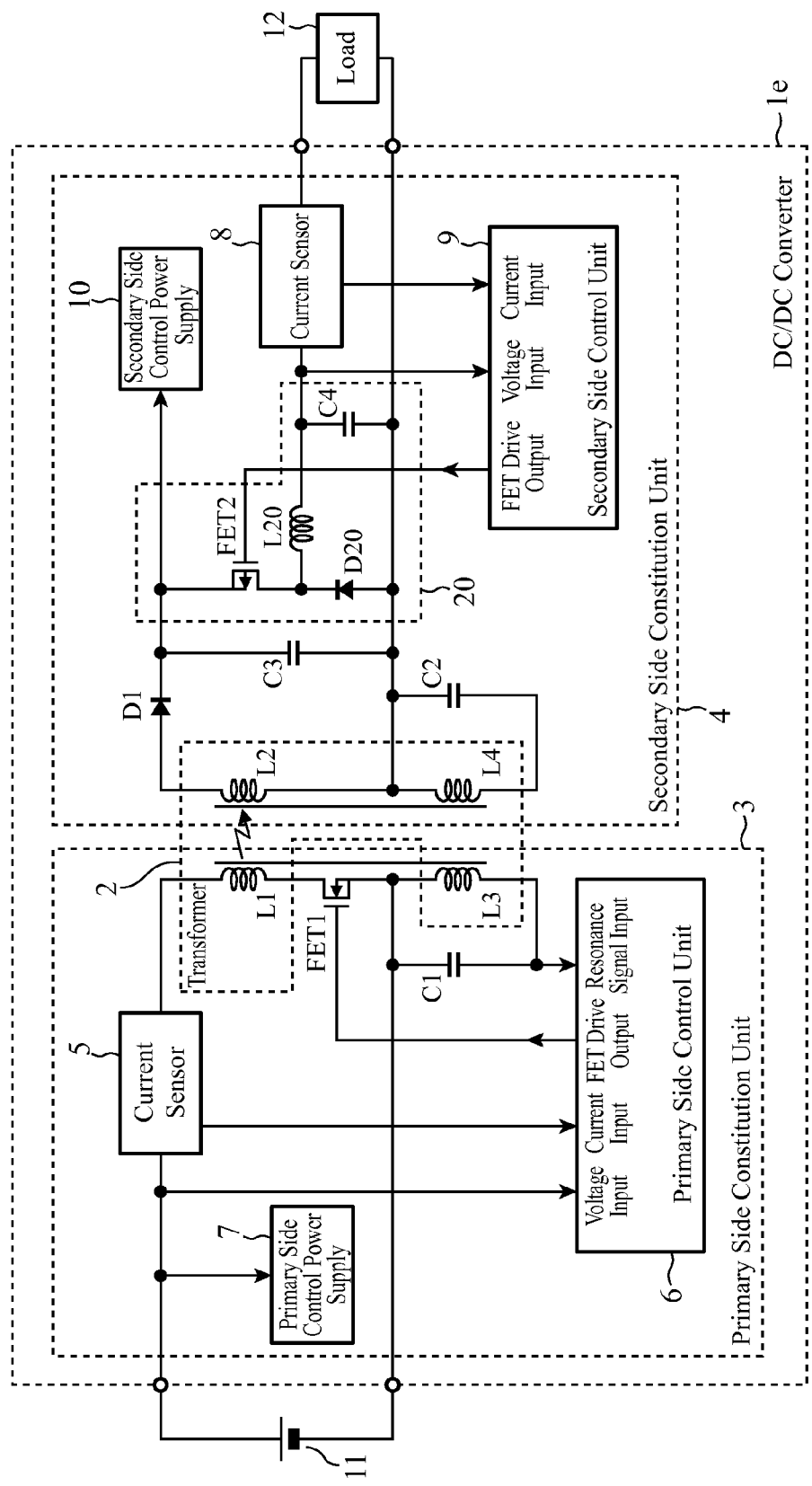
FIG. 10 is a circuit diagram illustrating a configuration of a DC/DC converter according to Embodiment 2 of the invention.

FIG. 10 is a circuit diagram illustrating a configuration of a DC/DC converter 1e according to Embodiment 2 of the present invention. The DC/DC converter 1e has a configuration in which a DC/DC converter 20 (DC/DC converter for conversion) that operates by the ON/OFF operations of the secondary side switching element FET 2 is added to the DC/DC converter 1 shown in FIG. 1. It is noted that in FIG. 10 parts that are the same as or equivalent to those of FIG. 1 are given by the same reference numerals, and descriptions thereof will be omitted.

The DC/DC converter 20 is constituted by the secondary side switching element FET 2, and a reflux (freewheel) diode D20, a coil L20, and a smoothing capacitor C4 provided downstream thereof. Magnetic field energy is stored in the coil L20 when the secondary side switching element FET 2 is turned ON, and the magnetic field energy stored in the coil L20 is discharged via the freewheeling diode D20 when the secondary side switching element FET 2 is turned OFF, and the resultant is outputted to the load 12 after smoothed by the smoothing capacitor C4.

Incidentally, a rating of the coil L20 may be such that the coil L20 stores the magnetic energy in which a current to be flown can be ensured when the secondary side switching element FET 2 is turned OFF, and a coil of such a small rating as to be saturated during the time when the secondary side switching element FET 2 is turned ON may be used.

Figure 11:
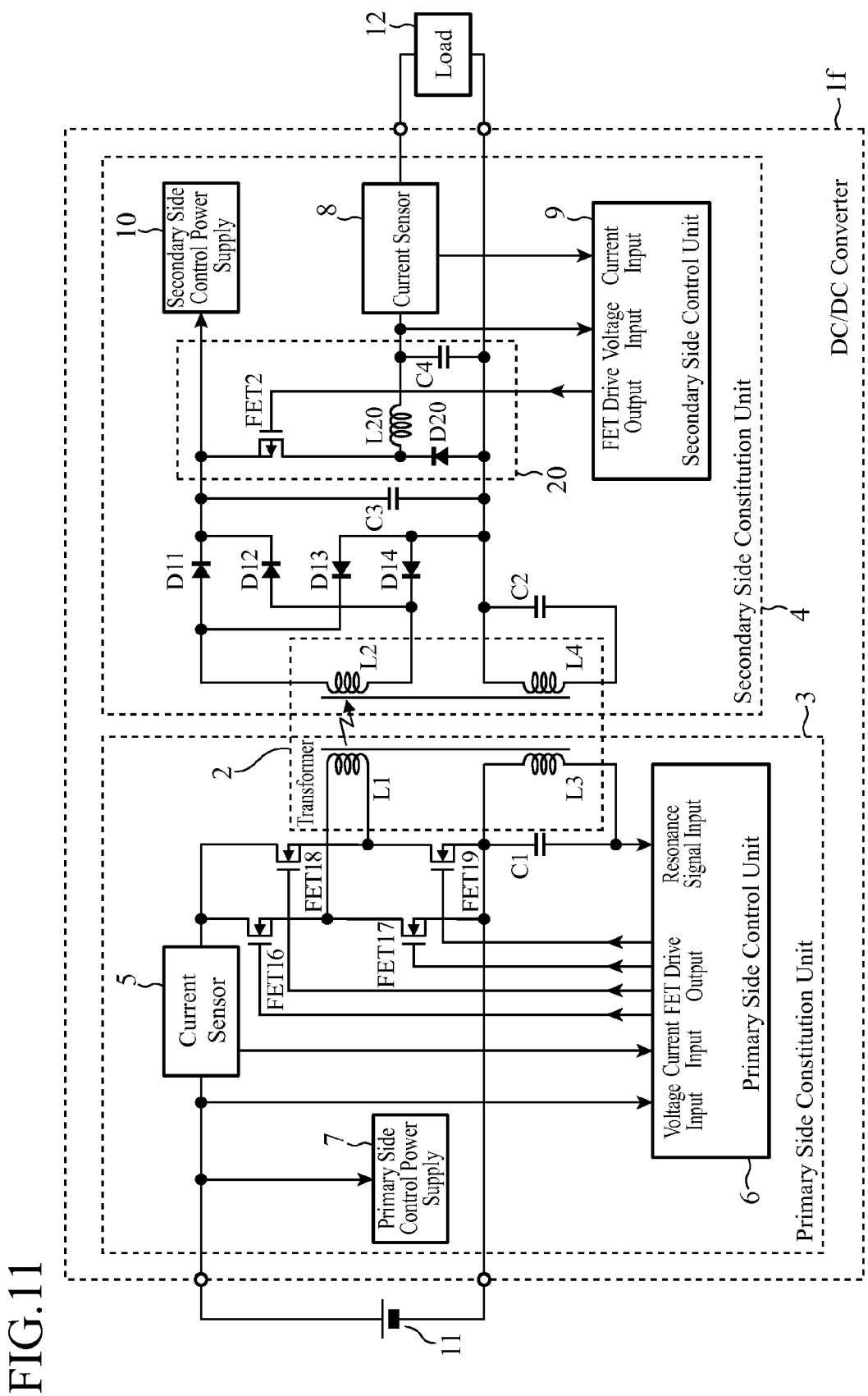
FIG. 11 is a circuit diagram illustrating a variation of the DC/DC converter (full bridge) according to Embodiment 2.

Furthermore, the DC/DC converter 20 may be applied to not only the DC/DC converter 1 shown in FIG. 1 but also the DC/DC converters 1a to 1d shown in FIG. 6 to FIG. 9. For example, a full bridge type DC/DC converter 1f shown in FIG. 11 has a configuration in which the DC/DC converter 20 is added to the DC/DC converter 1d shown in FIG. 9.

From the above, according to Embodiment 2, in the DC/DC converter 1e, a secondary side constitution unit 4 is configured to include the DC/DC converter 20 for output conversion to be operated by the secondary side switching element FET 2. For this reason, a voltage or current with reduced ripples can be outputted even during an intermittent operation of the secondary side switching element FET 2 to thereby improve the performance of the DC/DC converter.

Embodiment 3

In the present Embodiment 3, a core (magnetic member) that forms the transformer 2 of the DC/DC converters 1 to 1f shown in the above Embodiments 1 and 2 will be described.

Figure 12:
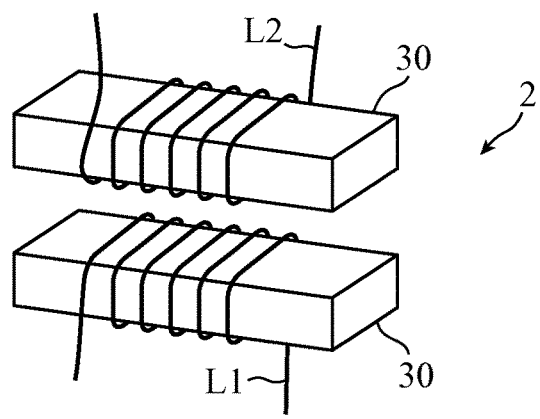
FIG. 12 is a perspective view illustrating a shape of a rod core used in a DC/DC converter according to Embodiment 3 of the invention.

FIG. 12 is a perspective view showing a shape of a rod core 30 of a substantially rectangular parallelepiped. The two rod cores 30 are arranged in parallel, and the primary winding L1 is wound around one of the rod cores 30, while the secondary winding L2 is wound around the other rod core 30 to thus form the transformer 2 shown in FIG. 6 to FIG. 8.

Further, although not shown, the auxiliary winding L3 is wound coaxially with the primary winding L1 on the rod core 30 of the primary side, while the auxiliary winding L4 is wound coaxially with the secondary winding L2 on the secondary rod core 30 of the secondary side to thus form the transformer 2 shown in FIG. 1 and FIG. 9 to FIG. 11.

Figure 13:
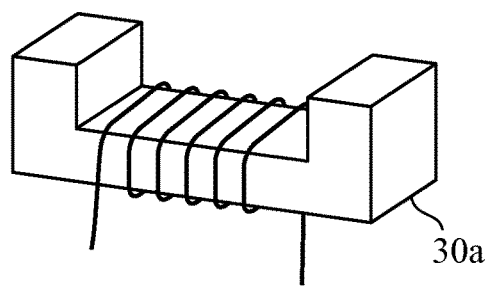
FIG. 13 is a perspective view illustrating a shape of a U-shaped core used in the DC/DC converter according to Embodiment 3.

FIG. 13 is a perspective view showing a shape of a U-shaped core 30a having protrusions prepared at both ends of a substantially rectangular parallelepiped. Note that because the U-shaped core 30a of the same shape is used in the primary side and secondary side, FIG. 13 shows only the core and winding in one of these sides. The protrusion parts of the two square U-shaped cores 30a are arranged to face each other, and the primary winding L1 (and auxiliary winding L3) is wound around the one U-shaped core 30a, while the secondary winding L2 (and auxiliary winding L4) is wound around the other U-shaped core 30a to thus constitute the transformer 2.

Figure 14:
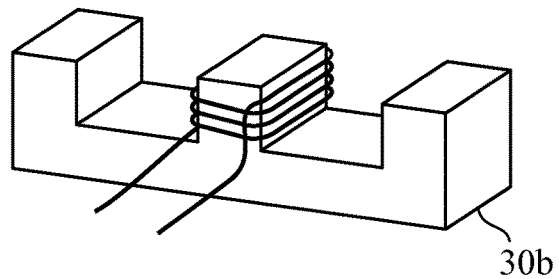
FIG. 14 is a perspective view illustrating a shape of an E-shaped core used in the DC/DC converter according to Embodiment 3.

FIG. 14 is a perspective view showing a shape of an E-shaped core 30b having protrusions prepared at both ends and in the middle of a substantially rectangular parallelepiped. Note that because the E-shaped core 30b of the same shape is used in the primary side and secondary side, FIG. 14 shows only the core and winding in one of these sides. The protrusion parts of the two E-shaped cores 30b are arranged to face each other, and the primary winding L1 (and auxiliary winding L3) is wound around the protrusion part in the middle of the one E-shaped core 30b, while the secondary winding L2 (and auxiliary winding L4) is wound around the protrusion part in the middle of the other E-shaped core 30b to thus constitute the transformer 2.

Figure 15:
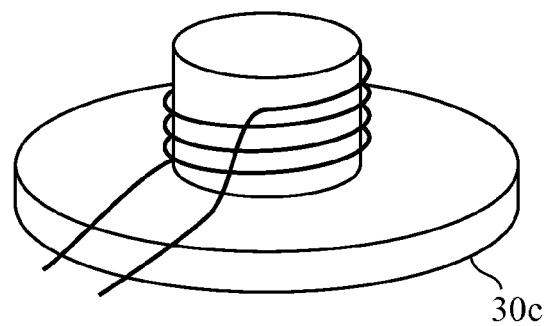
FIG. 15 is a perspective view illustrating a shape of a disc-shaped core used in the DC/DC converter according to Embodiment 3.

FIG. 15 is a perspective view showing a shape of a disc-shaped core 30c having a protrusion prepared in the center of a disc. Note that because the disc-shaped core 30c of the same shape is used in the primary side and secondary side, FIG. 15 shows only the core and winding in one of these sides. The protrusion parts of the two disc-shaped cores 30c are arranged to face each other, and the primary winding L1 (and auxiliary winding L3) is wound around the protrusion part in the middle of the one disc-shaped core 30c, while the secondary winding L2 (and auxiliary winding L4) is wound around the protrusion part in the middle of the other disc-shaped core 30c to thus form the transformer 2.

Figure 16:
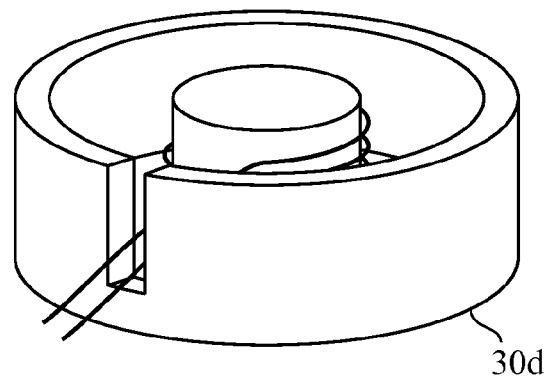
FIG. 16 is a perspective view illustrating a shape of a cylindrical core used in the DC/DC converter according to Embodiment 3.

FIG. 16 is a perspective view showing a shape of a bottomed cylindrical core 30d having a protrusion prepared in the center. Note that because the cylindrical core 30d of the same shape is used in the primary side and secondary side, FIG. 16 shows only the core and winding in one of these sides. The cylindrical parts and protrusion parts of the two cylindrical cores 30d are arranged to face each other, and the primary winding L1 (and auxiliary winding L3) is wound around the protrusion part in the middle of one cylindrical core 30d, while the secondary winding L2 (and auxiliary winding L4) is wound around the protrusion part in the middle of the other cylindrical core 30d to thus form the transformer 2.

For the magnetic material constituting the rod core 30, U-shaped core 30a, E-shaped core 30b, disc-shaped core 30c, and cylindrical core 30d, a magnetic material such as ferrite, silicon steel laminations, a magnetic powder kneaded resin, or the like is available, and further a combination of these magnetic materials can also be used.

From the above, according to Embodiment 3, it is contemplated that in the DC/DC converter 1, the magnetic member wound by the primary winding L1 or secondary winding L2 is formed in a substantially rod shape, a substantially rectangular parallelepiped shape, a substantially disc shape, or a substantially cylindrical shape. For this reason, the DC/DC converter having the primary side constitution unit and secondary side constitution unit separable from each other can be configured by using the cores in the substantially rod shape and substantially rectangular parallelepiped shape suitable for a small power one, and the cores in the substantially disc shape and substantially cylindrical shape suitable for a large power one.

Embodiment 4

In the present Embodiment 4, an on-board unit of a first example that uses the DC/DC converters 1 to 1f shown in the above Embodiments 1 to 3 will be described. The DC/DC converters 1 to 1f are used for supplying power to a load 12 (load unit) equipped in a part (movable part) separable from a vehicle. Hereinafter, the DC/DC converter 1 representing the DC/DC converters 1 to 1f is used as an example, and it will be described with reference to FIG. 1.

There are a trunk lid, and a bonnet (hood), for example, for the part separable from the vehicle. The trunk lid and bonnet can be separated (opened/closed) from the vehicle body. Also, there are lamps such as a tail lamp and a stop lamp for the load 12 equipped in the trunk lid. Also, there are lamps such as a head lamp and clearance lamp for the load 12 equipped in the bonnet.

Specific examples will be described below.

Figure 19:
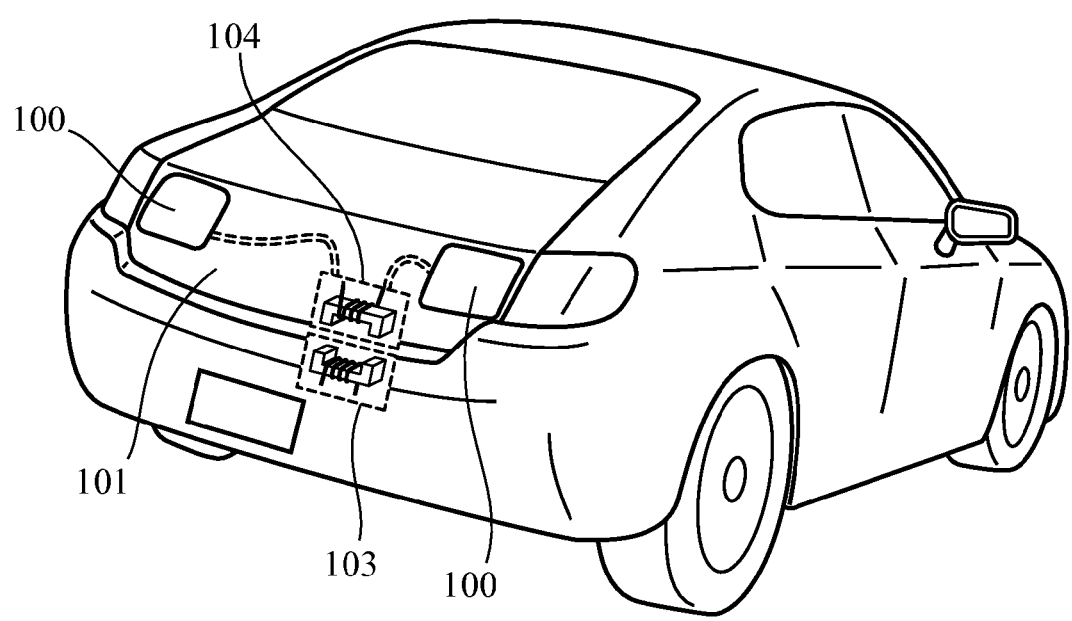
FIG. 19 is a perspective view illustrating an installation example of a lighting device for lighting the LED serving as the light source of the tail lamp of FIG. 17.

In the vehicle shown in FIG. 19 described previously, the DC/DC converter 1 is used for a lighting device that supplies power for lighting to the light source provided in the tail lamp 100 installed in the trunk lid 101. The primary side constitution unit 3 is installed in the vehicle body side on which an on-board battery (corresponding to the DC power source 11 in FIG. 1) is mounted, while the secondary side constitution unit 4 is installed in a part facing the primary side constitution unit 3 in the trunk lid 101 side, to thus supply the power for lighting to the light source (corresponding to the load 12 in FIG. 1) provided in the tail lamp 100. With this configuration, there is no need to route a wiring for supplying the power for lighting to the light source provided in the tail lamp 100 from the vehicle body side to the tail lamp 100 via a hinge part and the trunk lid 101.

When the trunk lid 101 is closed, the secondary side control unit 9 of the secondary side constitution unit 4 performs the intermittent control of the secondary side switching element FET 2 to thus adjust the output power to a value suitable for lighting the light source provided in the tail lamp 100. The primary side control unit 6 of the primary side constitution unit 3 detects the intermittent operation of the secondary side switching element FET 2, and controls the primary side switching element FET 1 so as to achieve a proper cycle or ratio of the intermittent operation to thus adjust the power supplied from the primary side constitution unit 3 to the secondary side constitution unit 4 to a proper value.

On the other hand, when the trunk lid 101 is open, an abnormal behavior is exhibited to be equal to a state where the secondary side switching element FET 2 is turned OFF for a long time and continuously. The primary side control unit 6 of the primary side constitution unit 3 determines the behavior at this time as an abnormal behavior, and reduces the power supplied from the primary side constitution unit 3 to the secondary side constitution unit 4 to a minimum level, and further stops the supply.

Although not shown, also with respect to the light sources provided for the stop light in the trunk lid 101, as well as the head lamp, clearance lamp, and the like in the bonnet, the DC/DC converter 1 may be configured and installed in a similar manner to a light-source lighting device provided for the tail lamp 100 in the trunk lid 101.

Additionally, semiconductor light sources such as an LED are desirable for the light sources to be used for the ones provided for the tail lamp 100, stop lamp, head lamp, clearance lamp, and the like described above. For example, in the case of the LED, the power for lighting is about 0.1 W to 100 W, the output voltage is about 2 V to 100 V, and the output current is about 10 mA to 1 A; because the LED can be lit with power lower than a conventional tungsten filament bulb, the DC/DC converter 1 can be miniaturized. Accordingly, the lighting device using the DC/DC converter 1 can also be miniaturized.

From the above, according to Embodiment 4, the on-board unit includes the load 12 mounted on the vehicle, the DC/DC converter 1 that supplies power to the load 12, and the movable part movable against the vehicle, and it is configured such that the primary side constitution unit 3 of the DC/DC converter 1 is installed in the vehicle, and that the secondary side constitution unit 4 and the load 12 are installed in the movable part. For this reason, a wiring routed with a detour from the vehicle body via the hinge part of the trunk lid or bonnet (movable part), and a member for protecting this wiring can be reduced. Thus, a lighting device can be configured with preserving a design (appearance) with the use of the separable DC/DC converter.

Moreover, according to Embodiment 4, the load 12 is the semiconductor light source, and the DC/DC converter 1 is configured to supply power to light the semiconductor light source. Because the LED can be lit with power lower than the conventional tungsten filament bulb, the DC/DC converter 1 can be made compact. Thus, the lighting device is miniaturized even with using the separable DC/DC converter, and preferable for an on-board one.

Embodiment 5

In the present Embodiment 5, an on-board unit of a second example that uses the DC/DC converters 1 to 1$f$ shown in the above Embodiments 1 to 3 will be described. The DC/DC converters 1 to 1$f$ are used for supplying power to the load 12 (load unit) equipped in the movable-side one of two members (fixed part and movable part) to be changed in relative positional relationship. Hereinafter, the DC/DC converter 1 representing the DC/DC converters 1 to 1$f$ is used as an example, and it will be described with reference to FIG. 1.

The on-board unit composed of the two members to be changed in relative positional relationship includes, for example, a door mirror, a fender mirror, and a room mirror that are composed of a mirror part (movable part) and a base part (fixed part). When a lamp is equipped in the mirror part of these mirrors, there is a need to supply power for lighting to the lamp.

Figure 17:
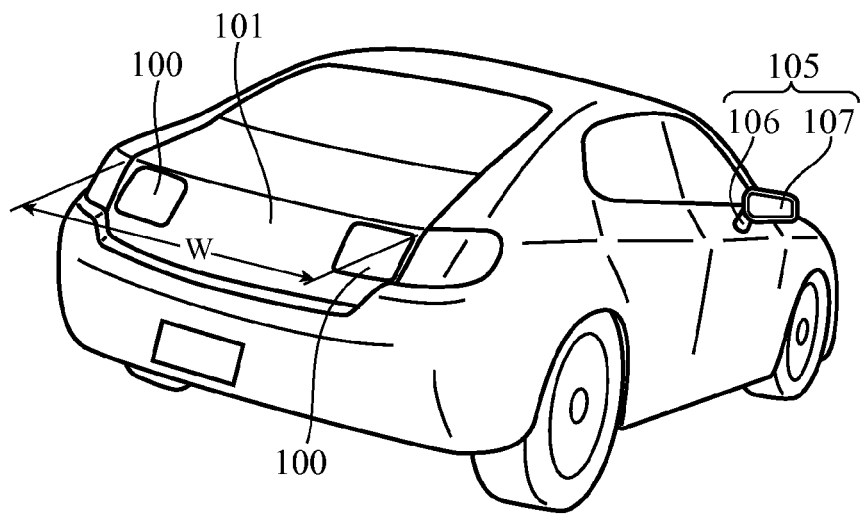
FIG. 17 is a perspective view illustrating an appearance of a rear part of a vehicle in which a tail lamp using an LED as a light source is installed in a trunk lid side.
Figure 18:
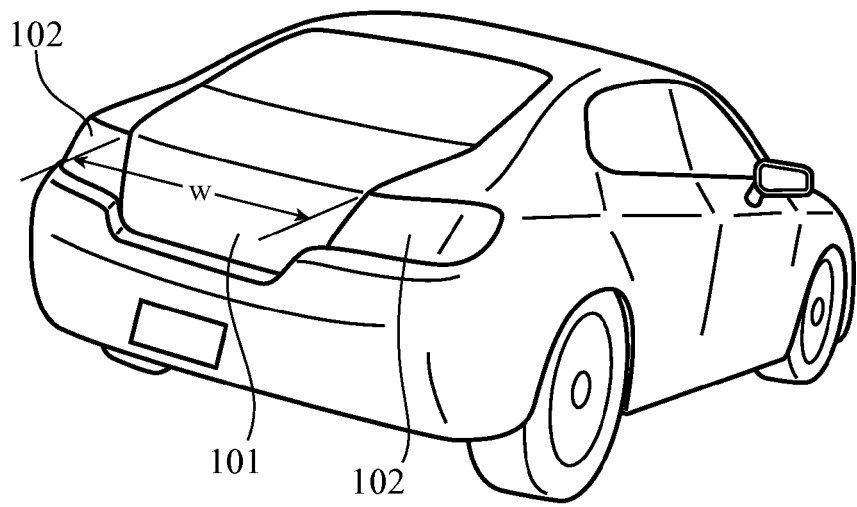
FIG. 18 is a perspective view illustrating an appearance of a rear part of a vehicle in which a tail lamp using a tungsten filament bulb as a light source is installed in a vehicle body side.

In the vehicle shown in FIG. 17 and described in the foregoing, a door mirror 105 is composed of a base part 106 fixed to the vehicle body, and a mirror part 107 movably mounted to the base part 106. Additionally, when the mirror part 107 is equipped with a winker, the DC/DC converter 1 is used as a lighting device that supplies the power for lighting to the light source for the winker. The primary side constitution unit 3 is installed in the base part 106 fixed to the vehicle body side, while the secondary side constitution unit 4 is installed in a part of the mirror part 107 facing the primary side constitution unit 3, to thus supply the power for lighting to the light source for the winker. With this configuration, a conductor wire between the winker in the mirror part 107 and the base part 106 can be reduced, so that the mirror part 107 that comes off simply the base part 106 by a shock can be configured. Similarly to the door mirror 105, the mirror parts of the fender mirror, room mirror, and the like can be configured to come off simply the base part by the shock.

Additionally, when the mirror part 107 comes off the base part 106 due to a shock applied from outside, an abnormal behavior is exhibited to be equal to a state where the secondary side switching element FET 2 is turned OFF for a long time and continuously. The primary side control unit 6 of the primary side constitution unit 3 can determine the behavior at this time as the abnormal behavior, and reduce the power supplied from the primary side constitution unit 3 to the secondary side constitution unit 4 to a minimum level, and further stop the supply.

Furthermore, another example of the on-board unit composed of the two members to be changed in relative positional relationship includes the following lamps: for example, a head lamp and a clearance lamp equipped across the vehicle body side and bonnet side, and a tail lamp and a stop lamp equipped across the vehicle body side and trunk lid side. Of the light sources used for these lamps, the separable DC/DC converter 1 may be used for the light sources equipped in the bonnet side or trunk lid side to thus supply the power for lighting thereto. With this configuration, there is no need to route a wiring for supplying the power for lighting of each of the light sources from the vehicle body side to the lamp via the hinge part and the trunk lid or bonnet.

From the above, according to Embodiment 5, the on-board unit includes: the load 12 mounted on the vehicle; the DC/DC converter 1 that supplies the power to the load 12; the fixed part fixed to the vehicle; and the movable part movable against the fixed part, and it is configured such that the primary side constitution unit 3 of the DC/DC converter 1 is installed in the fixed part, and that the secondary side constitution unit 4 and the load 12 is installed in the movable part. For this reason, the conductor wire between the light source provided in the mirror part 107 (movable side) of the on-board door mirror 105, fender mirror, room mirror, or the like, and the base part 106 (fixed side) in the vehicle body side can be reduced, so that the mirror part that comes off simply the base part by the shock can be configured.

In addition, a wiring routed with a detour from the vehicle body via the hinge part of the trunk lid or bonnet (movable part), and a member for protecting this wiring can be reduced. Thus, a lighting device can be configured with preserving a design (appearance) with the use of the separable DC/DC converter.

Moreover, according to Embodiment 5, with the use of the semiconductor light source as the light source equipped in the movable part, the lighting device that uses the DC/DC converter 1 can be made compact to be suitable for an on-board one, similarly to the above Embodiment 4.

Embodiment 6

In the above Embodiments 4 and 5, the light-source lighting devices using the DC/DC converters 1 to 1$f$ are described; however, the application is not limited to this. Meanwhile, the output of large power in the DC/DC converters 1 to 1f is possible as mentioned above. Thus, in the present Embodiment 6, as an application for large power of the DC/DC converters 1 to 1f, an example applied to a charging device for charging an on-board battery of an electric car or the like will be described. Note that the charging power of the battery is about 100 W to 10 kW, the output voltage is about 12 V to 400 V, and the output current is about 1 A to 30 A.

Hereinafter, the DC/DC converter 1 representing the DC/DC converters 1 to 1f is used as an example, and it will be described with reference to FIG. 1.

For example, the charging device is configured with the DC/DC converter 1 shown in FIG. 1, the primary side constitution unit 3 is installed in the floor (ground side) of a parking lot, and the secondary side constitution unit 4 is installed in the bottom face of a vehicle. The DC power source 11 is generated from a commercial AC power source via a rectifier unit, and the on-board battery (load 12) is charged via the separable primary side constitution unit 3 and secondary side constitution unit 4 configured to be separable from each other. In other words, a power transmission device of the AC power source side is constituted by the primary side constitution unit 3, and an on-board power reception device is constituted by the secondary side constitution unit 4, and the charging device is provided by one set of the two devices. In such a way, the following easy-to-handle charging device can be configured: there is no need to cable-connect the AC power source side and the on-board battery side by electric wires for feedback and for charging.

Incidentally, in the above, the primary side constitution unit 3 is disposed on the ground; however, the installed location may be different from the above, as long as it is a position such that the primary side constitution unit 3 and secondary side constitution unit 4 can be faced to each other.

In the charging device for the on-board battery that uses the DC/DC converter 1, when the vehicle is not stopped in the parking lot, the primary side control unit 6 of the primary side constitution unit 3 installed in the parking lot is waiting in a state that repeats the predetermined period t1 of the power supply operation and the predetermined waiting time t2. A charging operation for the on-board battery is started by the following operation of the primary side constitution unit 3 and secondary side constitution unit 4.

The vehicle is stopped at a prescribed place in the parking lot where the primary side constitution unit 3 and the secondary side constitution unit 4 face each other, an instruction is issued from the vehicle side by a manual or automatic operation to the secondary side control unit 9 of the secondary side constitution unit 4, and an receiving operation for the charging power is started by performing the intermittent operation of the secondary side switching element FET 2.

The primary side control unit 6 of the primary side constitution unit 3 detects the intermittent operation of the secondary side switching element FET 2, and switches from the waiting state to the charging operation to thus perform a continuous power supply operation to the secondary side constitution unit 4, and start a power transmission operation for the charging power.

On the other hand, the charging operation for the on-board battery is ended by the following operation:

When detecting completion of the charging for the battery by monitoring the output voltage and so on, the secondary side control unit 9 turns OFF the secondary side switching element FET 2 continuously. When the OFF state of the secondary side switching element FET 2 carried out by this operation passes for the predetermined period t1 or more, the primary side control unit 6 of the primary side constitution unit 3 determines that the secondary side switching element FET 2 is in the OFF state, and stops the power supply to the secondary side constitution unit 4 and returns to the waiting state.

Note that when the vehicle also moves in the middle of the charging and leaves the parking lot, a behavior is exhibited to be equal to the OFF state that passes for the predetermined period t1 or more in the secondary side switching element FET 2, and thus the power supply is stopped by the operation of the primary side control unit 6 of the primary side constitution unit 3 to return to the waiting state.

From the above, according to Embodiment 6, the following charging device for charging the on-board battery is configured with the use of the DC/DC converter 1: the primary side constitution unit 3 of the converter 1 is installed outside the vehicle, and the secondary side constitution unit 4 is installed in the vehicle. For this reason, a battery charging device capable of charging the on-board battery in a non-contact manner can be configured without using the electric wires for feedback and for charging that connect the power transmission device installed in the parking lot and the power reception device in the vehicle.

It is noted that in the present invention, a free combination in the embodiments, a modification of arbitrary components in the embodiments, or an omission of arbitrary components in the embodiments is possible within a range of the invention.

INDUSTRIAL APPLICABILITY

As described above, since the DC/DC converter of the present invention is contemplated such that the line-commutated DC/DC converter to allow separation of the primary side and secondary side of the transformer is simply configured, it is suitable for use of the on-board unit such as the lighting device for supplying the power for lighting to the light source provided in the tail lamp equipped in the trunk lid, the charging device for supplying the power for charging to the on-board battery from outside of the vehicle, and so on.

1, 1a to 1f: DC/DC converter
2: transformer
3, 103: primary side constitution unit
4, 104: secondary side constitution unit
5: primary side current sensor
6: primary side control unit
7: primary side control power supply
8: secondary side current sensor
9: secondary side control unit
10: secondary side control power supply
11: DC power source
12: load
20: DC/DC converter (DC/DC converter for conversion)
30: rod core
30a: U-shaped core
30b: E-shaped core
30c: disc-shaped core
30d: cylindrical core
100, 102: tail lamp
101: trunk lid
105: door mirror
106: base part (fixed part)
107: mirror part (movable part).

The invention claimed is:

1. A DC/DC converter configured to allow separation of a primary side constitution unit and a secondary side constitution unit of a transformer,
the primary side constitution unit including:
a primary winding of the transformer;
a primary side switching element that intermits a current flowing from an external power source to the primary winding; and
a primary side control unit that controls power supplied to the primary winding to an arbitrary value by operating an intermittent operation of the primary side switching element, and
the secondary side constitution unit including:
a secondary winding of the transformer;
a secondary side switching element that intermits a current flowing from the secondary winding to a load connected to the secondary side constitution unit; and
a secondary side control unit that controls power supplied to the load to an arbitrary value by operating an intermittent operation of the secondary side switching element,
wherein the primary side control unit detects an electrical behavior inside the primary side constitution unit generated by the intermittent operation of the secondary side switching element, and controls power supplied from the primary winding to the secondary winding by operating the primary side switching element on the basis of this electrical behavior.

2. The DC/DC converter according to claim 1, wherein the electrical behavior is a fluctuation of a voltage generated in the primary winding, or a fluctuation of a current flowing through the primary winding.

3. The DC/DC converter according to claim 1, wherein the primary side constitution unit includes a primary side auxiliary winding magnetically coupled to the primary winding, and the electrical behavior is a fluctuation of a voltage generated in the primary side auxiliary winding, or a fluctuation of a current flowing through the primary side auxiliary winding.

4. The DC/DC converter according to claim 1, wherein the secondary side control unit, as the intermittent operation of the secondary side switching element, performs an operation changing a repetition cycle of conduction and non-conduction by making constant one of a conducting time and a non-conducting time of the secondary side switching element, and making variable the other of the conducting time and the non-conducting time of the secondary side switching element, or performs an operation changing a ratio of the conducting time and non-conducting time by making constant the repetition cycle of the conduction and non-conduction.

5. The DC/DC converter according to claim 4, wherein the primary side control unit controls the power supplied from the primary winding to the secondary winding such that the intermittent operation of the secondary side switching element has a predetermined cycle, or such that a predetermined ratio of the conducting time and non-conducting time is achieved.

6. The DC/DC converter according to claim 1, wherein the secondary side constitution unit includes a smoothing capacitor that smooths an output of the secondary side switching element.

7. The DC/DC converter according to claim 1, wherein the secondary side constitution unit includes a DC/DC converter for conversion that is operated by the secondary side switching element and converts an output of the secondary winding arbitrarily.

8. The DC/DC converter according to claim 1, wherein when the electrical behavior generated by the operation of the secondary side control unit cannot be detected for a predetermined period during the intermittent operation of the primary side switching element, the primary side control unit stops the operation of the primary side switching element.

9. The DC/DC converter according to claim 1, wherein when the electrical behavior generated by the operation of the secondary side control unit cannot be detected for a predetermined period during the intermittent operation of the primary side switching element, the primary side control unit stops the operation of the primary side switching element for a predetermined waiting time and then resumes the intermittent operation of the primary side switching element, continues this intermittent operation of the primary side switching element when the electrical behavior can be detected at the time of this resumption, and stops the operation of the primary side switching element for the predetermined waiting time again when the electrical behavior cannot be detected.

10. The DC/DC converter according to claim 1, wherein a magnetic member wound by the primary winding or the secondary winding is a substantially rod shape or a substantially rectangular parallelepiped shape.

11. The DC/DC converter according to claim 1, wherein a magnetic member wound by the primary winding or the secondary winding is a substantially disc shape or substantially cylindrical shape.

12. The DC/DC converter according to claim 1, wherein one or both of the primary side constitution unit and the secondary side constitution unit include a wiring and a capacitor for resonance to thus constitute a resonance type DC/DC converter.

13. An on-board unit comprising: a load unit mounted on a vehicle; and a DC/DC converter according to claim 1 that supplies power to the load unit, further comprising: a movable part that is movable against the vehicle, wherein the primary side constitution unit of the DC/DC converter is installed in the vehicle, and the secondary side constitution unit and the load unit are installed in the movable part.

14. An on-board unit comprising: a load unit mounted on a vehicle; and a DC/DC converter according to claim 1 that supplies power to the load unit, further comprising: a fixed part fixed to the vehicle; and a movable part that is movable against the fixed part, wherein the primary side constitution unit of the DC/DC converter is installed in the fixed part, and the secondary side constitution unit and the load unit are installed in the movable part.

15. The on-board unit according to claim 13, wherein the load unit is a semiconductor light source, and the DC/DC converter is a lighting device that supplies power to light this semiconductor light source.

16. The on-board unit according to claim 14, wherein the load unit is a semiconductor light source, and the DC/DC converter is a lighting device that supplies power to light this semiconductor light source.

17. A charging device comprising a DC/DC converter according to claim 1 that supplies charging power to a battery mounted on a vehicle, wherein the primary side constitution unit of the DC/DC converter is installed outside the vehicle, while the secondary side constitution unit is installed in the vehicle.

* * * * *